United States Patent [19]

Dover et al.

[11] Patent Number: 5,064,000

[45] Date of Patent: Nov. 12, 1991

[54] METHOD OF AND APPARATUS FOR CUTTING SOD WHICH ROLLS IN A SEMI-FLACCID SHEET INTO SOD ROLL

[75] Inventors: Gary H. Dover, Bucyrus; Larry D. Meyer, Louisburg, both of Kans.

[73] Assignee: Bucyrus Equipment Co., Inc., Bucyrus, Kans.

[21] Appl. No.: 605,569

[22] Filed: Oct. 30, 1990

[51] Int. Cl.$^5$ .................. A01B 45/04; A01B 63/14
[52] U.S. Cl. .................. 172/19; 172/459; 242/55.1; 242/67.2; 280/486
[58] Field of Search .................. 172/19, 20, 459, 460, 172/313; 242/55.1, 67.2; 280/411.1, 486, 492; 56/6, 14.9, 15.7, DIG. 3, DIG. 10, DIG. 14

[56] References Cited

U.S. PATENT DOCUMENTS

| | | |
|---|---|---|
| 905,985 | 12/1908 | Clove . |
| 2,345,425 | 3/1944 | Phillips . |
| 2,614,477 | 10/1952 | Habenicht . |
| 2,617,347 | 11/1952 | Provost . |
| 2,709,329 | 5/1955 | Neal . |
| 2,756,661 | 7/1956 | Frisbie et al. .................. 172/20 |
| 2,998,081 | 8/1961 | Hartmangruber et al. . |
| 3,509,944 | 5/1970 | Brouwer et al. .................. 172/19 |
| 3,519,082 | 7/1970 | Miner . |
| 3,540,535 | 11/1970 | Brouwer et al. .................. 172/20 |
| 3,590,927 | 7/1971 | Brouwer et al. . |
| 3,658,134 | 4/1972 | Bibby . |
| 3,672,452 | 6/1972 | Miner .................. 172/19 |
| 3,747,686 | 7/1973 | Beck .................. 172/20 |
| 3,807,504 | 4/1974 | Nunes, Jr. . |
| 3,887,013 | 6/1975 | Helberg . |
| 3,935,904 | 2/1976 | Beck . |
| 4,142,691 | 3/1979 | Watton .................. 172/19 |
| 4,345,659 | 8/1982 | Arnold . |
| 4,354,556 | 10/1982 | Evans .................. 172/19 |
| 4,553,606 | 11/1985 | Arnold . |
| 4,616,713 | 10/1986 | Shattuck .................. 172/19 |
| 4,621,696 | 11/1986 | Brouwer . |
| 4,632,192 | 12/1986 | Hooks .................. 172/19 |
| 4,674,577 | 6/1987 | Meyer . |
| 4,828,040 | 5/1989 | Schumacher .................. 172/19 |
| 4,892,153 | 1/1990 | Cooling et al. .................. 172/20 |
| 4,903,778 | 2/1990 | Brouwer et al. .................. 172/19 |
| 4,944,352 | 7/1990 | Brouwer et al. .................. 172/19 |

FOREIGN PATENT DOCUMENTS

| | | | |
|---|---|---|---|
| 153103 | 8/1985 | European Pat. Off. .................. | 172/19 |
| 570108 | 1/1933 | Fed. Rep. of Germany . | |

OTHER PUBLICATIONS

P. 39 of Jan./Feb. 1989 issue Turf News.

*Primary Examiner*—Dennis L. Taylor
*Assistant Examiner*—Spencer Warnick
*Attorney, Agent, or Firm*—Kokjer, Kircher, Bowman & Johnson

[57] ABSTRACT

A sod cutting device having a pair of sod cutting blades offset such that their interior ends are aligned in the direction of cutting. Two strips of sod may thus be cut simultaneously with minimal waste. The two cutting blades are connected to inidividual cutter frames which are pivotably connected to respective lateral ends of a pivot frame. The pivot frame is in turn pivotably mounted at its center to a main frame of the device. This allows each cutter frame to follow the contours of the land and thus improves cutting depth consistency. The cut sod is conveyed up a first conveyor to a second conveyor which is mounted behind the first conveyor. A netting is introduced between the two conveyors under the sod such that the sod, together with the netting thereunder, travels up the second conveyor. The sod and netting are then rolled about a mandrel with the netting supporting the delicate sod. When a sod roll of sufficient size has been formed, the second conveyor is pivoted downwardly about its forward end. This causes the sod roll to roll off the conveyor. A ramp system may be provided at the rear of the conveyor to avoid dropping forces on the sod roll.

20 Claims, 4 Drawing Sheets

METHOD OF AND APPARATUS FOR CUTTING SOD WHICH ROLLS IN A SEMI-FLACCID SHEET INTO SOD ROLL

BACKGROUND OF THE INVENTION

1. Field of the Invention

The present invention relates in general to methods of, and apparatus for, cutting sod. In particular, the present invention relates to an improved method of forming rolled sod and an apparatus for the improved cutting of sod and for the practice of the noted method.

2. Description of the Related Art

It has been known for many years to remove sod from fields of grass for later placement at remote locations to produce lawns which are aesthetically pleasing in a short amount of time. Various devices for removing the sod from the fields of grass have also been known. These devices are typically in the form of a trailer drawn behind a tractor or other vehicle. The trailer includes a cutting blade extending parallel to the ground which is introduced into the soil and drawn along with the trailer to cut loose the sod from the soil. An inclined conveyor is typically arranged immediately behind the cutting blade to receive the sod after it has been cut. The cut sod is transported up the inclined conveyor to a point where it may be manually placed upon a pallet.

Two general types of sod are produced. These are slab sod and roll sod. Slab sod is produced as noted above with a transverse cut being made through the strip of sod before or while it is produced. The slabs are then stacked upon the pallet as noted above. It is also known to produce roll sod, typically by rolling the slab of sod to produce a spiral roll. The finished rolls are then stacked upon pallets as with the slab sod.

One general problem associated with these types of devices is that the trailer is attached to the tractor by a hitch at the forward end and is supported above the ground by a pair of wheels near the rear end. The cutting blade, which is attached to the rigid trailer frame, necessarily follows the movements of the trailer, which do not necessarily coincide with that of the ground at the cutting blade. This can often result in the sod thickness and cutting depth having unacceptable fluctuations.

A further problem associated with sod in general is the delicate nature of the sod. The forces exerted upon the sod during cutting and conveying can often result in the sod being broken, causing delays or loss of that portion of the sod. This is further aggravated when the sod is manually transported from the conveyor to the pallet.

Finally, the manual transport of the sod from the conveyor to the pallet is a problem in itself. The sod, which is both heavy yet delicate, often requires two operators for the manual placement on the pallet. These labor costs can greatly increase the cost of producing the sod.

SUMMARY OF THE INVENTION

It is therefore an object of the present invention to provide a device for cutting sod in which the cutting blade may follow the contours of the land.

It is a further object to provide a method of and apparatus for cutting delicate sod which allows the sod to be consistently maintained as a single strip during rolling with a minimum of manual intervention.

It is yet another object of the present invention to provide a method of and apparatus for cutting sod which allows completed sod rolls to be removed from the cutting and rolling apparatus quickly and with minimum manual intervention.

It is yet a further object of the present invention to provide a sod cutting apparatus which increases the amount of sod cut per unit time.

These and other objects of the present invention are met by an improved sod cutting device including a trailer having a main frame with a trailer hitch at the forward end thereof and wheels mounted thereto near the rear of the trailer. A pivot frame is mounted to the main frame for pivoting about an axis parallel to the direction of movement of the trailer. A cutter frame is pivotally mounted to the pivot frame at each lateral end thereof for pivoting about an axis parallel to the direction of movement of the trailer. Each of the cutter frames includes rollers for contacting the ground and partially supporting the cutter frame, and a cutting blade for cutting the sod.

The rollers and blades are offset in the longitudinal direction such that the interior ends of both blades are substantially aligned during normal cutting. This allows the cutting blades to follow the contour of the land and doubles the amount of sod cut per unit time.

A pair of inclined conveyors are mounted behind the blades to support and transport the cut sod. The first inclined conveyor is fixed to the frame of the trailer. The second conveyor is spaced slightly rearwardly from the first conveyor. This space allows the introduction of a netting material below the sod introduced on the second conveyor. This netting material is then rolled with the sod to support same. The sod is rolled about a mandrel rotatably mounted above the second conveyor.

After the sod roll has been completed, the second conveyor is pivoted about its forward end, inclining the second conveyor in the opposite direction. The sod roll may then simply roll off the conveyor. Extensions mounted on the second conveyor may provide an inclined ramp leading from the end of the second conveyor to the ground, ensuring that the completed sod roll is not subject to destructive forces when leaving the conveyor.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
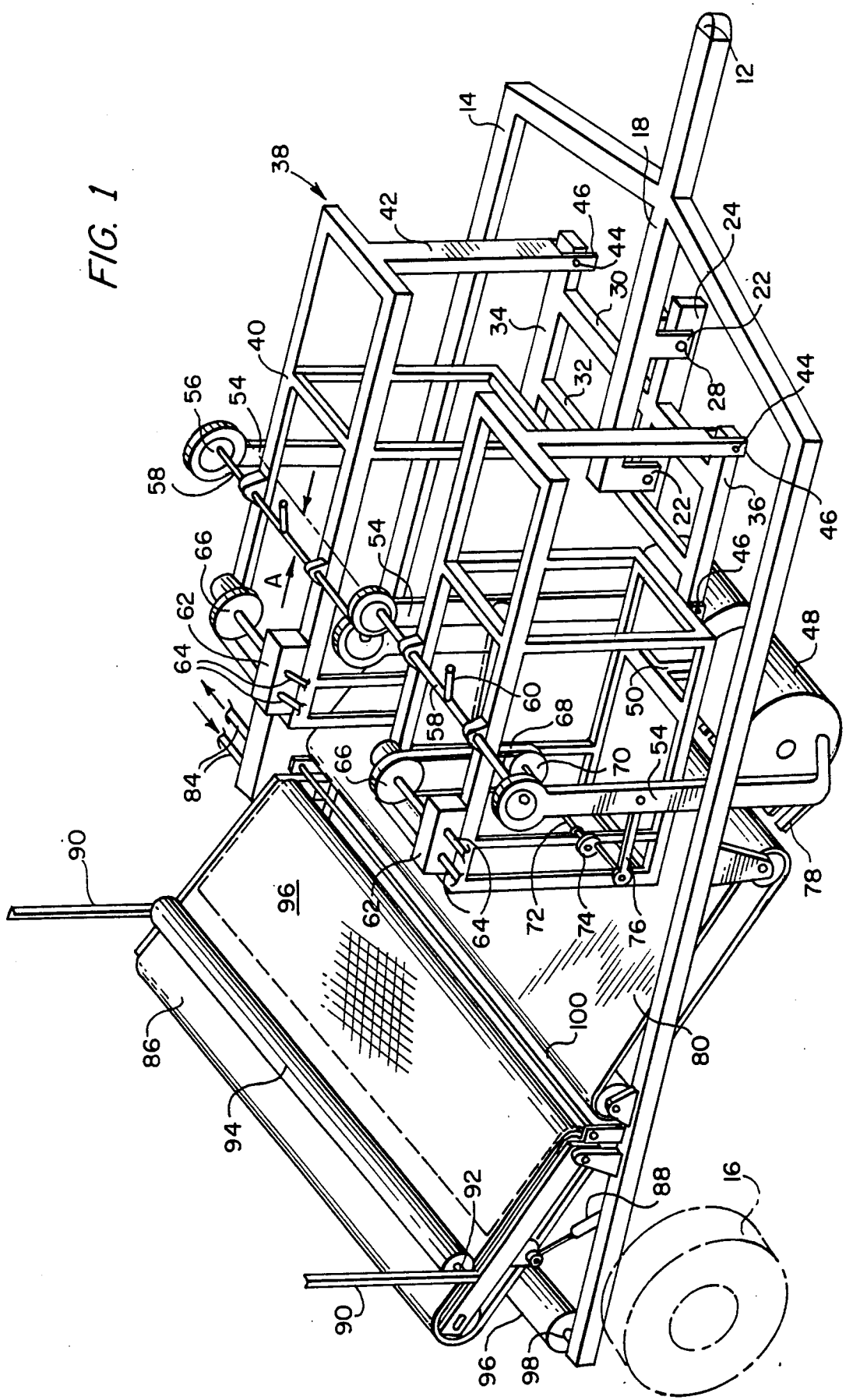
FIG. 1 is a perspective view of an embodiment of the present invention.
Figure 2:
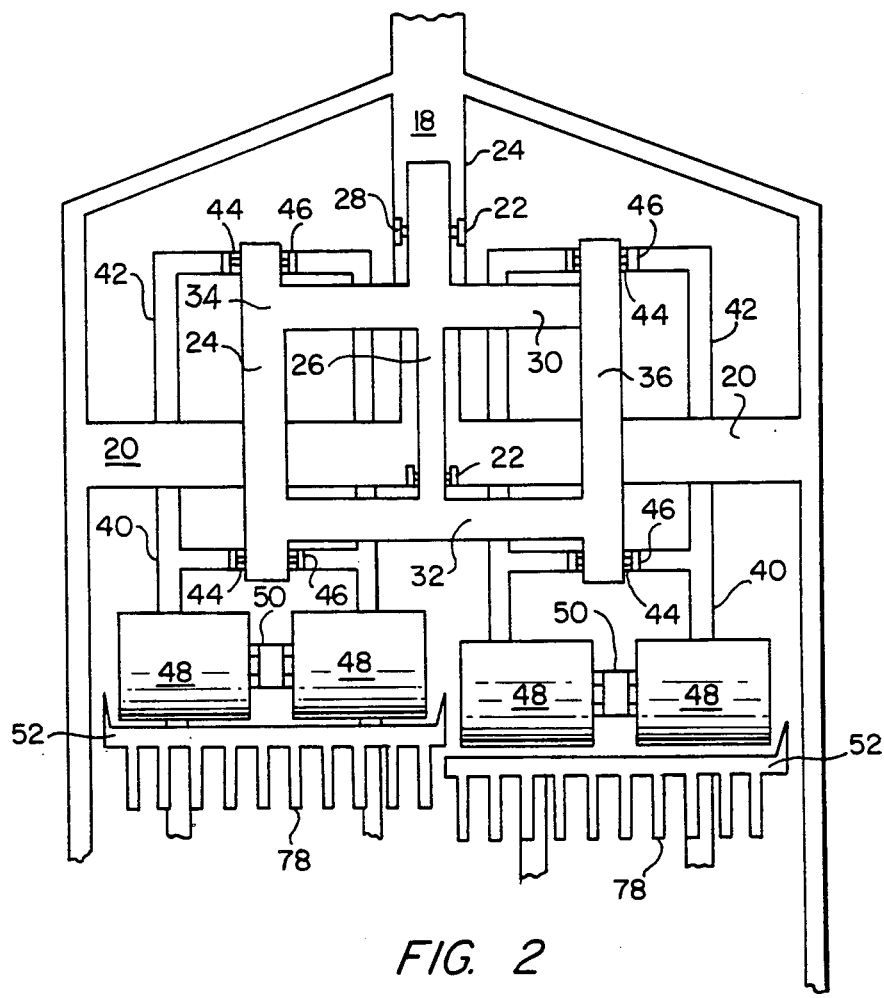
FIG. 2 is a bottom view showing the pivot and blade arrangement of the device of the present invention.

With reference to FIGS. 1 and 2, the device of the present invention is generally designated by numeral 10 and takes the general form of a trailer. The forward end of the device includes a trailer hitch 12 of standard design. The hitch 12 is rigidly connected to a rigid main frame 14. Near the rearward end of the device 10, a pair of wheels 16 (one of which is shown) are mounted to the main frame 14 for rotation with respect thereto. As with a typical trailer, the wheels 16 and hitch 12, when attached to a towing vehicle, support the main frame 14 above ground level.

The present invention is of course not limited to a trailer pulled by a towing vehicle. Specifically, the main frame may be attached to the side of a vehicle, or may be part of a self-propelled vehicle.

Extending rearwardly from the hitch 12 along the center line of the device 10 is a center brace 18. The rearward end of center brace 18 is fixed to a cross brace 20 which extends transversely of the trailer and is fixed to the right and left sides of main frame 14 (cross brace 20 being shown in dashed lines in FIG. 1 for clarity). The center brace 18 and cross brace 20 therefore provide a rigid support structure within the main frame 14.

Figure 2A:
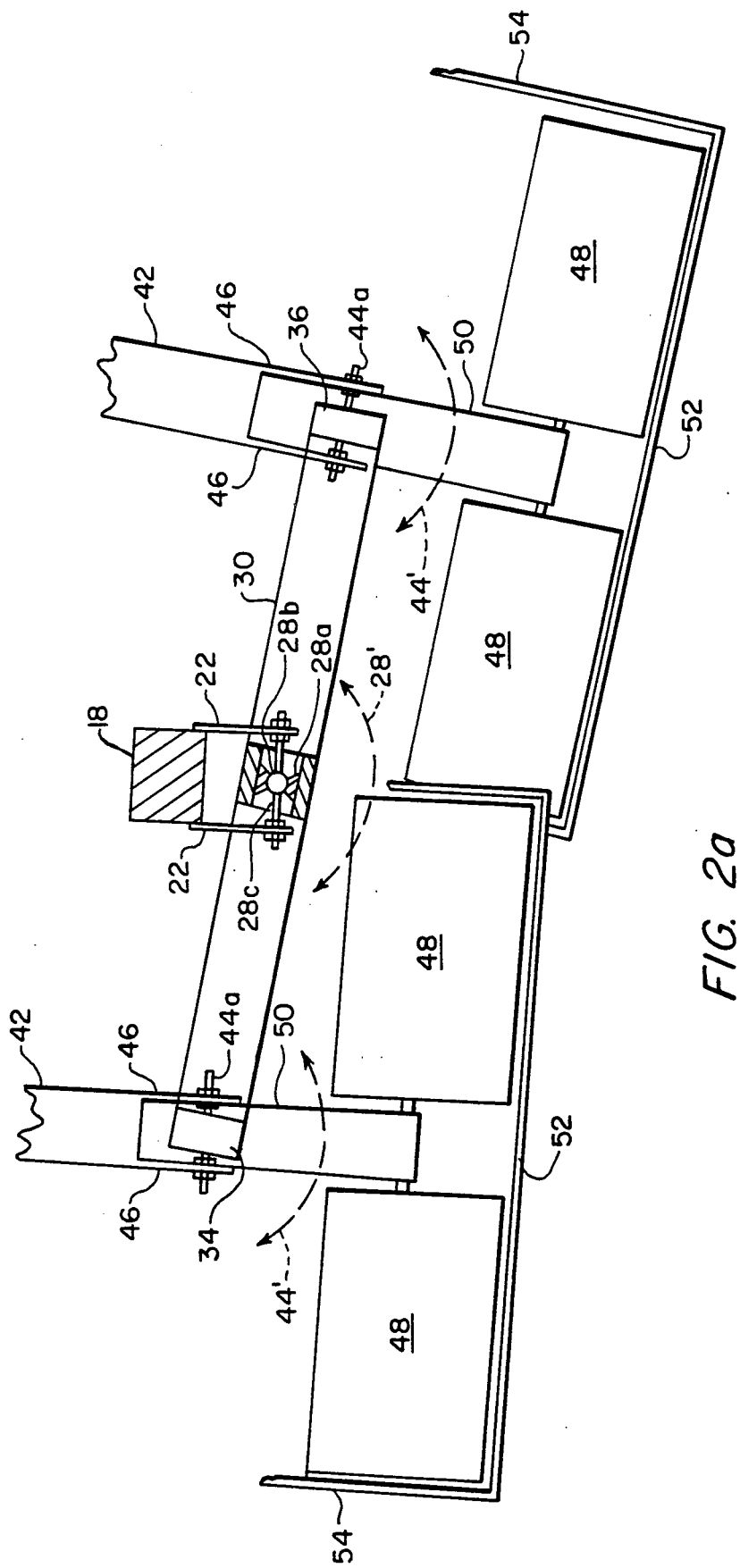
FIG. 2a is a front view of the pivot and blade arrangement in partial cross-section to illustrate the operation thereof.

A front and rear pair of brace flanges 22 extend downwardly from center brace 18 and a pivot frame 24 is pivotably mounted between these brace flanges 22. Specifically, a center pivot bar 26 is mounted between the brace flanges 22 by main pivot means 28 which allows the center pivot bar to pivot about a line parallel to the direction of movement of the trailer (i.e. parallel to the center line of the trailer) as illustrated in FIG. 2a by dashed line 28'. The main pivot means 28 may be any arrangement allowing the desired pivoting motion, and may conveniently be a self-aligning bearing, that is, a semi-spherical cage 28a mounted within center pivot bar 26 and housing a semi-spherical bearing member 28b with a rod 28c extending therethrough and fixed to the brace flanges 22. Where main pivot means 28 is formed by self-aligning bearings, the provision of front and rear brace flanges 22 prevents pivoting of pivot frame 24 about a line perpendicular to the direction of movement of the trailer.

The pivot frame 24 also includes forward and rear side bars 30, 32 extending outwardly from each lateral side thereof. The pivot frame is completed by right and left lateral pivot bars 34, 36 fixed to the outer ends of the front and rear side bars 30, 32.

Connected to each of the lateral pivot bars 34 and 36 is a cutter frame, generally designated by reference numeral 38.

Each of the cutter frames 38 includes a rigid three-dimensional rectangular subframe 40. Extending forwardly from each subframe 40 is a pivot extension 42. The lower, forward end of subframe 40 and lower, forward end of pivot extension 42 are pivotably connected to the respective lateral pivot bars 34, 36. This pivotal connection is effected by means of cutter pivot means 44, which may be self-aligning bearings similar to main pivot means 28 having rods 44a therethrough connected to cutter flanges 46 mounted on the subframe 40 and pivot extension 42. The cutter pivot means 44 allow the cutter frames 38 to pivot with respect to the associated lateral pivot bar about an axis parallel to the direction of travel of the trailer (i.e., parallel to the longitudinal axis of main frame 14), as illustrated in FIG. 2a by dashed lines 44'. As with the main pivot means, the pivotal connection at the subframe and at the pivot extension prevents pivoting of the cutter frames about a line perpendicular to the direction of movement of the trailer.

Each cutter frame 38 also includes a roller extension 50 extending downwardly from the subframe 40. The lower end of roller extension 50 rotatably mounts a pair of rollers 48, with the rollers extending laterally from the sides of the roller extension 50.

The rollers 48 engage and follow the ground during operation of device 10. As is readily apparent, during this movement the cutter pivot means 44, pivot frame 24 and pivot means 28 allow the cutter frames 38 to rotate as a pair about an axis parallel to the longitudinal axis of the main frame 14, and to rotate individually about the respective lateral pivot bar. As such, the cutter frames 38 may follow the contours of the soil to insure that the rollers 48 constantly engage the ground.

Ensuring that the rolls 48 constantly engage the ground surface is important because each cutter frame 38 includes a cutting blade 52. Each cutting blade 52 is elongated and extends laterally slightly behind and below the rollers 48. In operation, the cutting blades 52 will be positioned a desired depth below the surface of the soil to cut the soil and grass roots to form the sod.

The blades 52 are mounted to the cutter frames 38 by an upwardly extending blade support 54 mounted to each lateral end of each cutting blade 52. The upper end of each blade support 54 is pivotally mounted about an adjustment cam 56. Each pair of circular adjustment cams 56 associated with each cutter frame 38 is connected together by an adjustment rod 58. The adjustment rod extends between the adjustment cams 56 and is connected thereto at a point spaced from the center of each adjustment cam 56. The adjustment rod 58 is connected to the subframe 40 by appropriate brackets and includes an adjustment handle 60.

Movement of the adjusting handle 60 will cause rotation of the adjustment rod 58 about its longitudinal axis. This will in turn cause rotation of the adjustment cams 56 about the longitudinal axis of the adjustment rod 58. Since the adjustment cams are connected to the adjustment rod off center, the center of each adjustment cam will be rotated about the longitudinal axis of adjustment rod 58. This movement of the center of the adjustment cams is employed to adjust the height of the cutting blade with respect to the rollers 48, since the blade support 54 pivots about the center of adjustment cam 56.

During cutting of the sod it is preferred that the blades 52 reciprocate forward and back. To effect this motion, the blade supports 54 are oscillated about their adjustment cams 56. This motion is caused by a motor 62 mounted on each subframe 40. The motors 62 are preferably hydraulic motors having input and output hydraulic lines 64. Each motor 62 turns a primary shaft upon which is mounted a main pulley 66. The pulley 66 is connected by a belt 68 to a secondary pulley 70 mounted upon a takeoff shaft 72. The takeoff shaft 72 is rotatably mounted upon subframe 40 by appropriate brackets. Eccentrics 74 are mounted upon each end of takeoff shaft 72. The eccentrics 74 rotate with the takeoff shaft 72 and have a pivotal connection, spaced from their center point, to respective drive arms 76. The forward end of drive arm 76 is rotatably connected to the blade support 54 at a point spaced from the adjustment cam 56.

In operation, rotation of motor 62 causes rotation of shaft 66. Through the belt 68 connected to main pulley 66, the secondary pulley 70 and takeoff shaft 72 with eccentrics 74 are rotated. The off-center connection between eccentric 74 and drive arm 76 causes the rearward end of drive arm 76 to orbit about the eccentric 74. This orbital motion of the rearward end of drive arm 76 in turn causes the blade support 54 to oscillate about adjustment cam 56 due to the pivotal connection between drive arm 76 and blade support 54. It is noted that duplicative elements of this drive for the cutting blades are not all shown in FIG. 1 for clarity.

This described arrangement will provide dual cutting blades to produce two strips of sod, one for each cutter frame 38. However, simply placing the cutter frames adjacent to each other, with the cutting blades therefore adjacent to each other, will result in two separate strips of sod being cut at laterally spaced positions. This would result in the waste of the small strip of grass between the cutting blades 52. To avoid this waste, one of the cutter frames 38 is elongated rearwardly by a distance A (FIG. 1) such that one of the cutting blades 52 is mounted rearwardly of the other cutting blade 52. The cutter frames and cutting blades may then be placed closer together in the lateral direction such that the interior ends of the cutting blades 52 are substantially aligned in the direction of movement, as is best shown in FIG. 2.

With this blade arrangement, the strip of sod cut by the rear cutting blade 52 includes the cut edge formed by the forward cutting blade 52 as it forms a strip of sod. The alignment of the interior edges of cutting blades 52 will of course vary slightly with the pivotal movement of the cutter frames 38 about the lateral pivot bars. The slight overlap or lateral spacing of the interior ends of cutting blades 52, is, however, considered to result in only minimal waste, and is acceptable.

It is noted that while the blade arrangement has been described with reference to two blades, this blade arrangement may be employed to cut any number of strips of sod with only occasional minimal waste between the blades. The aligned blade arrangement may be employed with blades mounted to the main frame as in the prior art, or plural pairs of cutter frames as described above may be employed.

The rear edges of cutting blades 52 include a plurality of tines extending rearwardly and upwardly therefrom. The tines 78 guide and support the cut sod rearwardly to a first conveyor 80. The conveyor 80 inclines upwardly towards the rear of the device and is of standard design, including a pair of cylinders or pulleys supporting a conveyor belt. The first conveyor 80 is fixed to mainframe 14 by appropriate brackets which allow necessary tensioning of the conveyor belt. The first conveyor 80 may be driven by a conveyor motor 82 fixed to the mainframe 14. The conveyor motor 82 is preferably a hydraulic motor having input and output hydraulic lines 84.

A second conveyor 86 is mounted rearwardly of first conveyor 80. Second conveyor 86 is also mounted to incline upwardly towards the rear, to provide a continuation of first conveyor 80. Second conveyor 86 is also of standard design, including a pair of rollers or pulleys supporting a conveyor belt. The second conveyor 86 may be driven by conveyor motor 82 or by a separate hydraulic motor.

The first and second conveyors are typically driven at ground speed. However, one or both of the conveyors may be driven at other speeds to place the sod strip in tension or compression, as dictated by the condition of the sod.

The forward end of second conveyor 86 is connected to mainframe 14 by a pair of brackets which allow pivoting of the second conveyor 86. The rearward end of conveyor 86 is supported by a pair of hydraulic pistons 88 (only one of which is shown) pivotably connected at one end to mainframe 14 and at the other end to a bracket connected to second conveyor 86. When hydraulic pistons 88 are in their extended position, second conveyor 86 is placed in the upwardly inclined position shown in FIG. 1. A further use for hydraulic pistons 88 will be described in further detail below.

Extending upwardly from each side of second conveyor 86 is a roller support 90. The roller supports 90 provide an abutment against which the ends of a mandrel rod 92 may rest. The mandrel rod 92 is an elongated rod extending through the center of a cylindrical mandrel 94. The mandrel rod 92 is insertable in, and removable from, the mandrel 94 for a purpose discussed below.

A roll of netting 96 is located beneath the second conveyor 86. The roll of netting is rotatably supported upon a netting rod 98 connected to the main frame 14. A netting guide rod 100 is located in the space between first conveyor 80 and second conveyor 86. Netting guide rod 100 is fixed to main frame 14 by appropriate brackets, which may be adjustable. The netting 96 is fed forward from the netting roll, is brought beneath netting guide rod 100 and is then folded back to lay upon the upper surface of second conveyor 86.

The method of rolling sod according to the present invention will now be described with reference to FIGS. 1 and 3.

A mandrel rod 92 is inserted within a mandrel 94, and the mandrel and rod are placed upon second conveyor 86 such that the ends of mandrel rod 92 abut the roll supports 90. The netting 96 is fed from the netting supply roll, is brought forward beneath netting guide rod 100 (and possibly other guide rods as shown in FIG. 3) and then folded back to lie upon the second conveyor 86. The entire device 10 is then moved forward by a towing vehicle with the motors 62 causing oscillation of the cutting blades 52, and the motor 82 driving the first and second conveyors 80, 86.

Figure 3:
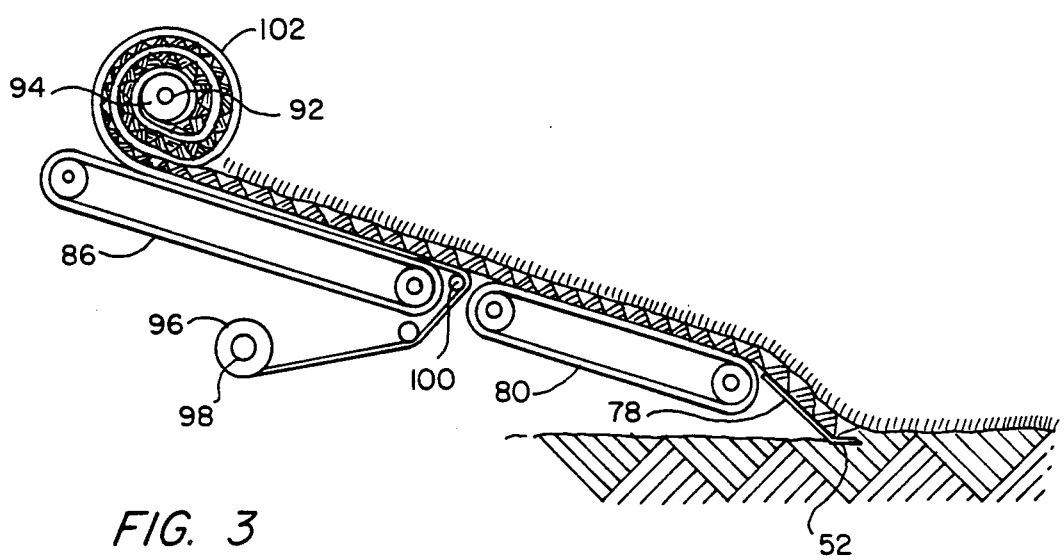
FIG. 3 is a schematic side view illustrating the method of the present invention.

As shown in FIG. 3, the blades 52 cut the soil and roots of the grass to form sod which is guided upwardly upon tines 78. The tines 78 guide the cut sod to the forward end of first conveyor 80. The sod is conveyed, or guided, rearwardly upon conveyor 80 to pass over netting guide rod 100.

As the netting 96 is immediately above the netting guide rod 100, the bottom surface of the sod comes into contact with the upper surface of netting 96 and rests thereupon. The sod and netting 96 are then conveyed rearwardly as a unit upon second conveyor 86. The tines 78 and conveyor 80, therefore, simply act in the disclosed embodiment as means to guide the sod from the cutting blades onto second conveyor 86 and therefore onto, and into contact with, the netting 96. When the sod and netting have passed beneath and slightly beyond mandrel 94, an operator manually folds the free end of the sod and netting over the mandrel 94. With the upper surface of the sod in contact with the outer surface of mandrel 94, the free end of the netting and sod is fed around mandrel 94 until the free end of the netting and sod is caught between the mandrel 94 and the remainder of the sod. At this point, continued cutting and conveying of the sod and netting will cause the sod to form a spiral configuration about mandrel 94.

As can be seen in FIG. 3, the netting 96, which is in contact with the lower surface of the sod, forms the outer surface of the sod roll 102. As such, netting 96 supports the sod and prevents damage thereto during the rolling operation. This will continue until the desired length of sod has been achieved. This may typically be approximately 100 feet, but longer lengths, even beyond 150 feet, are possible.

Upon reaching the desired length, the sod and netting are cut laterally to form a trailing edge for the sod roll 102 and a new free edge for the sod being cut. The sod and netting may be cut on the conveyor by an operator, or the sod may be cut automatically by a sod cut-off known in the art and the netting alone cut on the conveyor. The trailing edge of the sod roll 102 is then rolled about the sod roll 102 to complete the spiral configuration and is pinned in place by members inserted through the trailing edge of the sod roll into the body of the sod roll 102. The sod roll 102 may then be removed from the conveyor 86, and the mandrel rod 92 removed from the mandrel. The sod roll 102 with mandrel 94 are then ready for transport to the site where the sod is to be laid.

The manual placement of the netting and sod over the mandrel may be simplified in some instances. Specifically, it may be possible to simply fold a length of the netting over the mandrel. If the free end of the netting travels back under the mandrel, it may begin spiraling automatically. A sufficient length of netting wound about the mandrel may cause the netting and sod to automatically roll about the mandrel, reducing the need for a skilled operator to place the leading edge of the netting and sod.

While the above description relates to two strips of sod being rolled with a single sheet of netting, one, or more, sheets of netting may be used with each strip of sod. In such a situation the sheets of netting would lie adjacent to each other on second conveyor 86.

Figure 5:
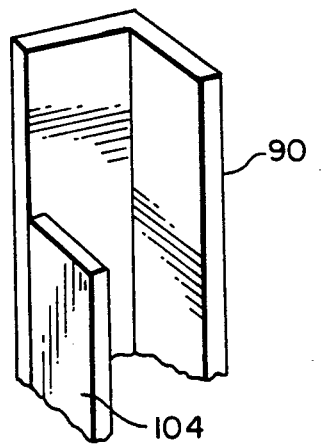
FIGS. 5 and 6 are perspective views of two embodiments of roll supports.

It should be noted that in FIG. 1 the roll supports 90 are shown as angle irons presenting a front and side face. The side face prevents movement of the mandrel rod 92 laterally of the device 10, and the front face prevents movement of the sod roll forward of the device. The forward movement of the sod roll 102 is due to the inclined orientation of second conveyor 86. As such, the sod roll 102 would tend to roll down the second conveyor 86, but is prevented by roll supports 90. This rolling tendency of sod roll 102 automatically forms the sod into the desired spiral configuration without manual intervention once the roll has begun. However, during the early stages of forming the sod roll, there may be insufficient weight in the sod roll 102 to overcome the forces necessary to curl the sod about the mandrel 94. For this reason, the roll supports 90 may take the configuration shown in either of FIGS. 5 or 6.

In these figures, the roll supports 90 include a rearward wall 104. This rearward wall prevents the sod roll and mandrel 94 from moving rearwardly with the upper surface of second conveyor 86 by providing an abutment against rearward movement of mandrel rod 92. Rear wall 104 may simply be a member welded to the angle which forms roll support 90, such that a c-section is formed. The rear wall 104 preferably extends upwardly only a sufficient distance to allow the sod roll 102 to obtain the weight required to roll forward due to gravity. This will allow the sod roll 102 to be rolled rearwardly off second conveyor 86 to remove the sod roll from the device 10 without interference from rear wall 104.

Figure 4:
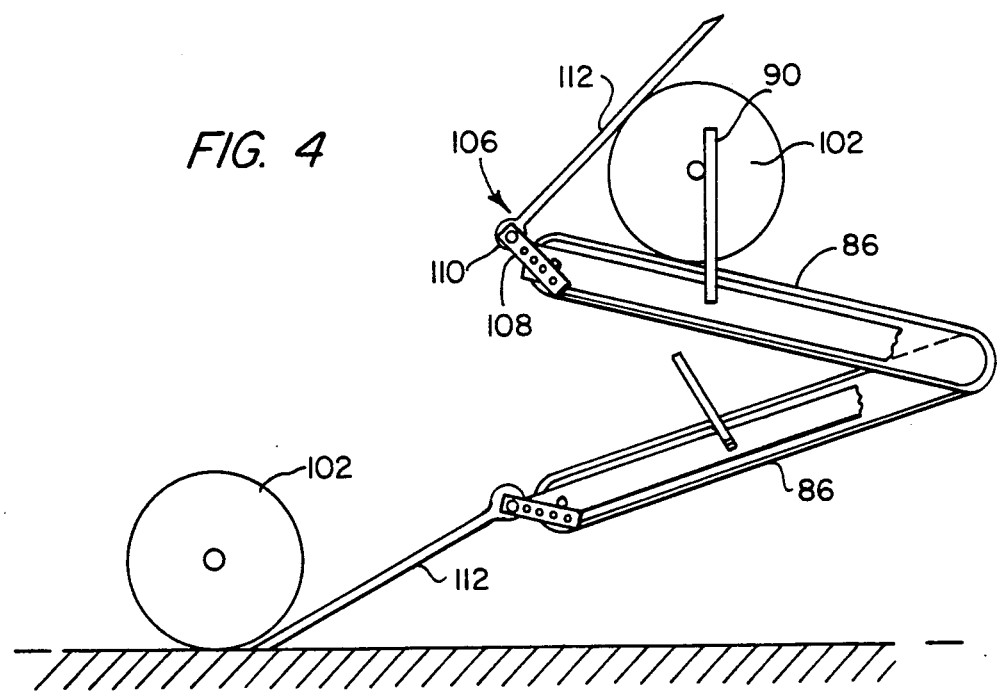
FIG. 4 is a simplified side view showing the operation of the conveyor extensions.

A preferred feature for removing the sod roll from the device is shown in FIG. 4. Second conveyor 86 is in its normal upwardly inclined position in the upper part of this figure, and the sod roll 102 is in its normal position of abutment against roll support 90. Attached to the rearward end of conveyor 86 is an exit ramp system generally designated as 106. Exit ramp system 106 includes a ramp bracket 108 adjustably mounted to each rear side of conveyor 86. The rearward ends of ramp brackets 108 receive the respective ends of a ramp support rod 110. Rotatably mounted on the ramp support rod 110 is an exit ramp 112. The ramp 112 may be in the form of a single plate extending across a majority of the width of the second conveyor 86 or may be a plurality of ramps, each having a lesser width.

During the rolling of sod roll 102, the ramps 112 may be pivoted about ramp support rod 110 to rest upon the sod roll 102. When the sod roll has reached the desired length, and the trailing end of the sod roll has been attached thereto, the hydraulic pistons 88 are retracted such that second conveyor 86 is inclined downwardly rather than upwardly, as shown in the lower portion of FIG. 4.

Since the mandrel rod 92 is at a greater height than rear wall 104 of roll support 90, the sod roll 102 will roll rearwardly down second conveyor 86. This rearward movement of sod roll 102 will pivot ramp 112 to the operative position in engagement with the ground, allowing sod roll 102 to continue rolling down the ramp 112 to rest upon the ground free of the device 10.

Figure 6:
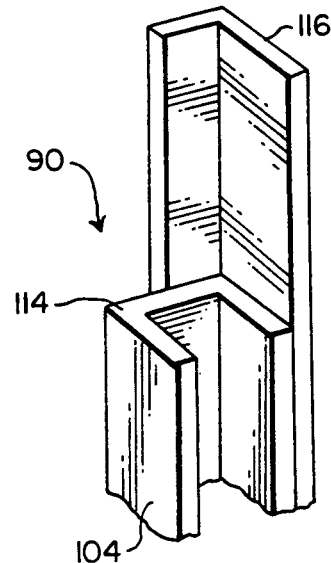

With reference to FIG. 6, the roll support 90 need not be a single rigid member fixed to conveyor 86, but may include a c-channel 114 fixed to the conveyor and an angle fixed to the main frame 14. The c-channel will be arranged with the free legs extending towards the interior of the device 10. As such, a first free leg will act as an abutment to prevent downward rolling of the sod roll 102 when the second conveyor 86 is in the upper operative position. The wall connecting the free legs of the c-channel 114 will prevent lateral movement of mandrel rod 92 while the second free leg will form the rear wall 104 needed during initial rolling. The c-channel 114 extends upwardly a lesser extent than angle 116, and extends only so far as rear wall 104 is needed.

When the sod roll has reached a diameter such that the mandrel rod 92 is higher than the top of c-channel 114, the mandrel rod 92 will abut against the angle 116, and remain in the proper position. When the second conveyor 86 is moved to the downward unloading position shown in FIG. 4, the angle 116 will remain in place, while c-channel 114 pivots with second conveyor 86. Since the mandrel rod 92 is higher than the top of c-channel 114, the c-channel will not block the rearward rolling of sod roll 102 off of second conveyor 86.

The angle 116 need not be adjacent to the c-channel 114 as in FIG. 6, but may be formed to provide a continuous extension of the c-channel.

Figure 7:
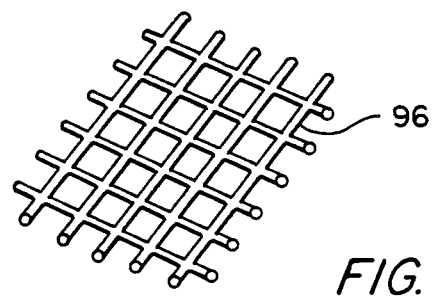
FIG. 7 is a perspective view of the support netting used in the present invention.

As noted above, the netting 96 serves to support the sod during the rolling thereof, and also supports the sod during storage, transport to the site at which the sod will be laid and during laying of the sod. The netting is preferably a plastic netting as shown in FIG. 7. It should be noted, however, that virtually any flaccid or semi-flaccid sheet material may be employed for the netting. In particular, a biodegradable netting would be highly advantageous, since the netting could remain on the sod as it is laid. Other types of netting which could have an adverse affect upon the growth of the lawn would be removed from the sod as the sod roll 102 is unrolled to lay the sod.

It is also noted that the various features of the present invention need not be limited to the combinations disclosed herein. For example, the pivotally mounted cutter frames 38 may be used with a conventional pallet stacking arrangement for strip or roll sod. Similarly, the netting may be applied to roll sod which is cut by a standard sod cutting device.

Finally, additional features or modifications common to sod cutting machines may of course be applied to the present device. For example, platforms may be attached near the rear wheel 16 to provide a support for the operator near the end of device 10. In such a case, it would be preferable for the operator platforms to be removable so that the device has the proper overall width to travel legally upon roads and streets. In view of the above, the present invention is by no means intended to be limited by the present description, but is only limited by the scope of the claims appended hereto.

What is claimed is:

1. An apparatus for forming sod, comprising:
    a main frame;
    means allowing movement of said main frame with respect to the ground in a cutting direction;
    a pivot frame pivotably connected to said main frame for pivoting about a main axis substantially parallel to said direction, said pivot frame including right and left pivot bars laterally spaced from said main axis in opposite lateral directions parallel to the ground;
    right means for cutting a strip of sod pivotably connected to said right pivot bar for pivoting about a right lateral axis substantially parallel said direction, said right means including means for contacting the ground; and
    left means for cutting a strip of sod pivotably connected to said left pivot bar for pivoting about a left lateral axis substantially parallel said direction, said left means including means for contacting the ground.

2. An apparatus as in claim 1, wherein said means for contacting the ground of said right means and said means for contacting the ground of said left means each comprise at least one roller rotatably connected to the respective said means for cutting a strip of sod.

3. An apparatus as in claim 1, wherein said means for cutting sod each includes a cutting blade extending laterally of said direction and having interior and exterior ends, said interior ends being in proximity to each other and substantially aligned in said direction with one of said interior ends being spaced forwardly of the other of said interior ends along said direction.

4. An apparatus as in claim 3, wherein said means for cutting sod each comprise a sub frame pivotably mounted to said respective pivot bars, and wherein said cutting blades are connected to said respective sub frames.

5. An apparatus as in claim 4, wherein said means for contacting the ground of said right means and said means for contacting the ground of said left means each comprise at least one roller rotatably connected to the respective said means for cutting a strip of sod.

6. An apparatus as in claim 5, further comprising a plurality of blade supports, one of said blade supports being fixed to each of said ends of said cutting blades at a first end of said blade support and a second end of said blade support being pivotably connected to said sub frame associated with said respective cutting blade, and further comprising means for oscillating said blade supports with respect to said associated sub frame.

7. An apparatus as in claim 6, wherein said oscillating means comprises a motor mounted on each of said sub frames, each said motor being operatively connected to said blade supports of said respective sub frame.

8. An apparatus for forming sod, comprising:
    a main frame;
    means allowing movement of said main frame with respect to the ground in a cutting direction;
    means, connected to said main frame, for cutting at least one strip of sod from the ground, the strip of sod having top and bottom sides;
    means, connected to said main frame, for placing at least one at least semi-flaccid sheet in contact with the bottom side of the at least one strip of sod; and
    means, connected to said main frame, for rolling the sod, with the sheet in contact therewith, into a spiral configuration with the sheet exterior.

9. An apparatus as in claim 8, wherein said placing means comprises:
    a conveyor connected to said main frame behind said cutting means, in said direction, and adapted to receive the sheet and the sod strip thereon and convey same substantially parallel to said direction;
    means connected to said main frame for supporting a supply of the sheet;
    means for guiding the sheet from said supporting means onto said conveyor; and
    means for guiding the sod strip from said cutting means onto said conveyor and therefore onto, and into contact with, the sheet.

10. An apparatus as in claim 9, wherein said means for cutting at least one strip of sod includes at least one cutting blade extending laterally of said direction and said conveyor comprises a second conveyor, and wherein said means for guiding the sod strip comprises:
    a first conveyor connected to said main frame between said second conveyor and said cutting blade, said first conveyor adapted to convey the sod in said direction and having a rearward end in operative proximity to a forward end of said second conveyor; and
    at least one tine connected to each said at least one cutting blade and extending rearwardly into proximity with a forward end of said first conveyor, said tine adapted to guide the sod from said blade to said first conveyor.

11. An apparatus as in claim 10, wherein said means for guiding the sheet comprises a guide rod connected to said main frame and extending laterally between said forward end of said second conveyor and said rearward end of said first conveyor.

12. An apparatus as in claim 9, wherein said conveyor is inclined downwardly in said direction, and wherein said means for rolling the sod comprises:
    a roll support mounted at each lateral side of said conveyor; and
    mandrel means disposed above said conveyor and adapted to receive the netting and sod thereabout, said mandrel means having lateral ends, each said lateral end adapted for abutting relationship with a respective one of said roll supports such that said roll supports prevent movement of said mandrel means along said incline of said conveyor due to gravity.

13. An apparatus as in claim 12, wherein each said roll support comprises an upwardly extending angle member having a front wall substantially perpendicular to said direction and a side wall substantially parallel to said direction, said side wall being connected to said front wall at a laterally exterior end of said front wall.

14. An apparatus as in claim 12, wherein each said roll support is fixed to said conveyor and said angle member extends upwardly a distance, and wherein each said roll support further comprises a rear wall substantially perpendicular to said direction and fixed to a rear end of said side wall such that said roll member has a cross section of a laterally inwardly opening U, and wherein said rear wall extends upwardly less than said distance.

15. An apparatus as in claim 13, wherein said conveyor has a front end pivotably connected to said main frame for pivoting about a laterally extending axis substantially perpendicular to said direction, and further comprising means for pivoting said conveyor between a first position wherein said conveyor is inclined downwardly in said direction and a second position wherein said conveyor is inclined upwardly in said direction.

16. A method of rolling sod, comprising the steps of:
providing:
a main frame;
means allowing movement of said main frame with respect to the ground in a cutting direction;
means, connected to said main frame, for cutting at least one strip of sod from the ground, the strip of sod having top and bottom sides;
means, connected to said main frame, for placing at least one at least semi-flaccid sheet in contact with the bottom side of the at least one strip of sod; and
means, connected to said main frame, for rolling the sod, with the sheet in contact therewith, into a spiral configuration with the sheet exterior;
moving said main frame in said direction to cut at least one strip of sod from the ground;
placing the at least one at least semi-flaccid sheet in contact with the bottom side of the at least one strip of sod; and
rolling the sod, with the sheet in contact therewith, into a spiral configuration with the sheet exterior.

17. A method as in claim 16, wherein said step of providing placing means comprises:
a conveyor connected to said main frame behind said cutting means, in said direction, and adapted to receive the sheet and the sod strip thereon and convey same substantially parallel to said direction;
means connected to said main frame for supporting a supply of the sheet;
means for guiding the sheet from said supporting means onto said conveyor; and
means for guiding the sod strip from said cutting means onto said conveyor and therefore onto, and into contact with, the sheet; and
wherein said placing step comprises:
guiding the sheet from said supporting means onto said conveyor; and
guiding the sod strip from said cutting means onto said conveyor and therefore onto, and into contact with, the sheet.

18. A method as in claim 17, wherein said step of providing means for rolling the sod comprises:
a roll support mounted at each lateral side of said conveyor; and
mandrel means disposed above said conveyor and adapted to receive the netting and sod thereabout, said mandrel means having lateral ends, each said lateral end adapted for abutting relationship with a respective one of said roll supports such that said roll supports prevent movement of said mandrel means along said incline of said conveyor due to gravity; and
wherein said rolling step comprises:
rolling the sod about said mandrel means.

19. A method as in claim 18, wherein;
said step of providing a conveyor further comprises:
said conveyor having a front end pivotably connected to said main frame for pivoting about a laterally extending axis substantially perpendicular to said direction; and
said providing step further comprises:
providing means for pivoting said conveyor between a first position wherein said conveyor is inclined downwardly in said direction and a second position wherein said conveyor is inclined upwardly in said direction; and
comprising the further step of:
pivoting said first conveyor, subsequent to said rolling step, from said first position to said second position, whereby the rolled sod may roll off of said conveyor to the ground.

20. A method of rolling sod, comprising the steps of;
cutting at least one strip of sod from the ground, the strip of sod having top and bottom sides;
placing at least one at least semi-flaccid sheet in contact with the bottom of the at least one strip of sod; and
rolling the sod, with the sheet in contact therewith, into a spiral configuration with the sheet exterior.

* * * * *